United States Patent
Shi et al.

(10) Patent No.: US 10,590,627 B2
(45) Date of Patent: Mar. 17, 2020

(54) HYDRAULIC CONTROL SYSTEM OF LEVELING OIL CYLINDER OF LOADING HEAD

(71) Applicant: NANJING FREETECH ROAD MAINTENANCE VEHICLE MANUFACTURING CORPORATION, Nanjing (CN)

(72) Inventors: Weibin Shi, Hongkong (CN); Hai Zou, Nanjing (CN); Huiwen Wang, Nanjing (CN)

(73) Assignee: NANJING FREETECH ROAD MAINTENANCE VEHICLE MANUFACTURING CORPORATION, Nanjing (CN)

( * ) Notice: Subject to any disclaimer, the term of this patent is extended or adjusted under 35 U.S.C. 154(b) by 32 days.

(21) Appl. No.: 16/080,012

(22) PCT Filed: Mar. 27, 2018

(86) PCT No.: PCT/CN2018/080665
§ 371 (c)(1),
(2) Date: Aug. 26, 2018

(87) PCT Pub. No.: WO2018/137723
PCT Pub. Date: Aug. 2, 2018

(65) Prior Publication Data
US 2019/0063042 A1 Feb. 28, 2019

(30) Foreign Application Priority Data
Jul. 10, 2017 (CN) .......................... 2017 1 0555485

(51) Int. Cl.
*F15B 21/08* (2006.01)
*E02F 9/22* (2006.01)
(Continued)

(52) U.S. Cl.
CPC .......... *E02F 9/2296* (2013.01); *E02F 9/2267* (2013.01); *E02F 9/2285* (2013.01);
(Continued)

(58) Field of Classification Search
CPC .......... E02F 9/2267; F15B 11/08; F15B 13/02
See application file for complete search history.

(56) References Cited

U.S. PATENT DOCUMENTS 6,308,612 B1 10/2001 Emanie et al.

FOREIGN PATENT DOCUMENTS

CN 103277355 A * 9/2013 ............. F15B 11/08
CN 203614480 5/2014
(Continued)

OTHER PUBLICATIONS

Machine Translation of CN103277355A.*

*Primary Examiner* — Michael Leslie
*Assistant Examiner* — Daniel S Collins

(57) ABSTRACT

The invention discloses a hydraulic control system of a leveling hydraulic cylinder of a loading head, characterized by comprising a hydraulic pump, a two-position three-way electronic control reversing valve, a three-position four-way electronic control reversing valve, a three-position four-way cam valve and a hydraulic cylinder. The invention not only can perform leveling by using the electric control system, but also comprises the hydraulic cam valve controlling the hydraulic cylinder for self-leveling, and the two leveling manners can be independently used or switched mutually, thus achieving a better leveling effect.

2 Claims, 1 Drawing Sheet

(51) Int. Cl.
*F16K 11/10* (2006.01)
*F15B 11/08* (2006.01)
*F15B 13/02* (2006.01)

(52) U.S. Cl.
CPC .............. *F15B 11/08* (2013.01); *F15B 13/02* (2013.01); *F15B 21/08* (2013.01); *F16K 11/105* (2013.01); *F15B 13/021* (2013.01)

(56) References Cited

FOREIGN PATENT DOCUMENTS

| | | |
|---|---|---|
| CN | 103835215 | 6/2014 |
| CN | 205047552 | 2/2016 |
| CN | 07120326 | 9/2017 |
| CN | 206917950 | 1/2018 |
| JP | H0885976 | 4/1996 |

* cited by examiner

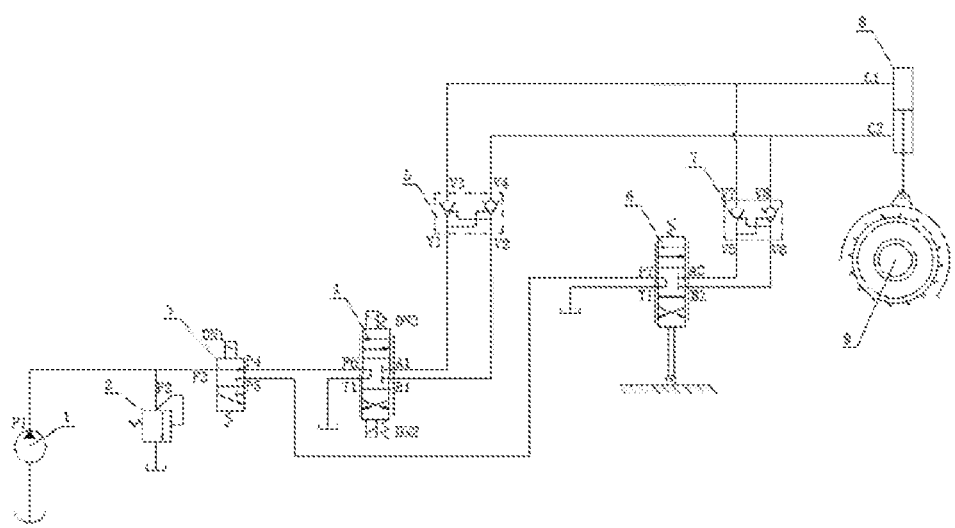

HYDRAULIC CONTROL SYSTEM OF LEVELING OIL CYLINDER OF LOADING HEAD

CROSS REFERENCE TO RELATED APPLICATION

This application claims priority to a PCT application PCT/CN2018/080665 filed on Mar. 27, 2018, which in turn claims priority to a Chinese Application No. CN 2017105554854, filed on Jul. 10, 2017. The PCT and Chinese Applications are incorporated herein by reference in their entireties.

TECHNICAL FIELD

The invention relates to a control system of a leveling device of a loading head of asphalt pavement recycling equipment, and more particularly relates to a hydraulic control system of a leveling oil cylinder of a loading head.

BACKGROUND ART

The traditional leveling device of the loading head of asphalt pavement recycling equipment adopts an oil cylinder leveling control, and generally uses an electric control hydraulic valve only for controlling the stroke of the oil cylinder to achieve the purpose of leveling; this system has very high requirements for the electric control system and needs complicated program control. Particularly, the electric control system may be out of work due to a failure, resulting in influencing the construction schedule.

SUMMARY OF THE INVENTION

The technical problem to be solved by the invention is to overcome the technical defects in the prior art and provides a hydraulic control system of a leveling oil cylinder of a loading head. The control system controls the leveling oil cylinder by using electronic control reversing valves and a cam reversing valve separately to achieve higher reliability. The hydraulic control system of the leveling oil cylinder of the loading head provided by the invention comprises a hydraulic pump, a two-position three-way electronic control reversing valve, a three-position four-way electronic control reversing valve, a three-position four-way cam valve and a hydraulic cylinder.

A piston rod of the hydraulic cylinder is connected onto a leveling mechanism (milling drum), the three-position four-way cam valve is arranged on the milling drum leveling mechanism, and the end of the valve element of the three-position four-way cam valve is in contact with the ground.

An oil inlet of the two-position three-way electronic control reversing valve is connected with the hydraulic pump, one oil outlet of the two-position three-way electronic control reversing valve is connected with an oil outlet of the three-position four-way electronic control reversing valve, and the other oil outlet of the two-position three-way electronic control reversing valve is connected with an oil inlet of the three-position four-way cam valve.

Two oil outlets of the three-position four-way electronic control reversing valve are respectively connected to a front oil port and a rear oil port of the hydraulic cylinder after passing through a hydraulic lock.

Two oil outlets of the three-position four-way cam valve are also respectively connected to the front oil port and the rear oil port of the hydraulic cylinder after passing through the hydraulic lock.

An overflow valve is arranged on an oil line between the hydraulic pump and the two-position three-way electric control reversing valve.

The invention not only can perform leveling by using the electric control system, but also comprises hydraulic cam valve controlling the oil cylinder for self-leveling, and the two leveling manners can be independently used or switched mutually, thus achieving a better leveling effect.

BRIEF DESCRIPTION OF THE DRAWINGS

FIG. 1 is a hydraulic schematic diagram of the hydraulic control system of the leveling oil cylinder of the loading head according to the invention.

DETAILED DESCRIPTION OF THE INVENTION

The invention is further illustrated in detail in conjunction with the drawings and specific embodiments.

As shown in the FIG. 1, the hydraulic control system of the leveling oil cylinder of the loading head according to the invention comprises a hydraulic pump 1, a two-position three-way electronic control reversing valve 3, a three-position four-way electronic control reversing valve 4, a three-position four-way cam valve 6 and a hydraulic cylinder (leveling cylinder) 8.

A piston rod of the hydraulic cylinder is connected onto a leveling mechanism 9, the three-position four-way cam valve 6 is arranged on a milling drum leveling mechanism, and the end of the valve element of the three-position four-way cam valve 6 is in contact with the ground.

An oil inlet P3 of the two-position three-way electronic control reversing valve 3 is connected with the hydraulic pump 1, one oil outlet P4 of the two-position three-way electronic control reversing valve 3 is connected with an oil outlet P6 of the three-position four-way electronic control reversing valve 4, and the other oil outlet P5 of the two-position three-way electronic control reversing valve is connected with an oil inlet P7 of the three-position four-way cam valve 6.

An oil outlet A1 of the three-position four-way electronic control reversing valve 4 is connected to a rear oil port C1 of the hydraulic cylinder 8 after passing through oil ports V1 and V3 of a hydraulic lock 5. An oil outlet B1 of the three-position four-way electronic control reversing valve 4 is connected to a front oil port C2 of the hydraulic cylinder 8 after passing through oil ports V2 and V4 of the hydraulic lock 5.

An oil outlet A2 of the three-position four-way cam valve 6 is connected to the rear oil port C1 of the hydraulic cylinder 8 after passing through oil ports V5 and V7 of the hydraulic lock. An oil outlet B2 of the three-position four-way cam valve 6 is connected to the front oil port C2 of the hydraulic cylinder 8 after passing through oil ports V6 and V8 of the hydraulic lock.

An overflow valve 2 is arranged on an oil line between the hydraulic pump 1 and the two-position three-way electric control reversing valve 3.

Specific control method is described as follows:
1. Contraction of the Piston Rod of the Electric Control Hydraulic Cylinder:

The port P1 of the hydraulic pump 1 provides the pressure oil, the P1 oil reaches the oil inlet P3 of the two-position three-way electric control reversing valve 3 after passing through the oil port P2, wherein the overflow valve 2 on the oil line between the hydraulic pump 1 and the two-position three-way electric control reversing valve 3 is used for limiting the highest pressure of the system to protect the hydraulic components of the system. At this time, the two-position three-way electric control reversing valve 3 is not powered, the pressure oil directly reaches P4 from P3 and then the port P4 pressure oil directly reaches the oil inlet P6 of the three-position four-way electric control reversing valve 4, wherein DN2 of the three-position four-way electric control reversing valve 4 is powered, the valve element moves upwards, the port P6 pressure oil reaches the oil outlet B1 of the three-position four-way electric control reversing valve 4; then the port B1 pressure oil reaches the port V2 of the hydraulic lock 5, and then reaches the port V4 through a check valve in the hydraulic lock 5 and finally reaches the front oil port C2 of the hydraulic cylinder 8; the piston rod of the hydraulic cylinder 8 contracts into the cylinder, and the leveling oil cylinder controls the leveling mechanism to move upwards. The oil returns from the port C1 of the hydraulic cylinder 8 to the oil port V3 of the hydraulic lock 5. Being controlled by the pressure oil in the port V2 (oil line control in the hydraulic lock), V3 is communicated with V1. The returned oil reaches the port A1 of the three-position four-way electric control reversing valve 4 through the ports V3 and V1 of the hydraulic lock 5; as the DN2 solenoid coil is powered, the port A1 of the three-position four-way electric control reversing valve is communicated with T1, and the returned oil flows back to the oil tank.

In the electric control system of the three-position four-way electric control reversing valve 4, the electric control components for stroke measurement are arranged on the leveling mechanism 9, and the measured distance is smaller than the preset standard distance in that case.

2. Extension of the Piston Rod of the Electric Control Hydraulic Cylinder:

The port P1 of the hydraulic pump 1 provides the pressure oil reaching the oil inlet P3 of the two-position three-way electric control reversing valve 3. The two-position three-way electric control reversing valve 3 is not powered, the pressure oil directly reaches the oil outlet P4 from the port P3, and then the outlet P4 pressure oil reaches the oil inlet P6 of the three-position four-way electric control reversing valve 4; at this time, DN3 of the three-position four-way electric control reversing valve 4 is powered, the valve element moves downwards, and the port P6 pressure oil reaches the oil outlet A1 of the three-position four-way electric control reversing valve 4; then the port A1 pressure oil reaches the port V3 by the check valve in the hydraulic lock after passing through V1 of the hydraulic lock 5, and then the pressure oil reaches the rear oil port C1 of the hydraulic cylinder 8; the piston rod of the hydraulic cylinder 8 extends out of the cylinder, and the hydraulic cylinder controls the leveling mechanism 9 to move downwards. The oil returns from the front port C2 of the hydraulic cylinder 8 to the oil port V4 of the hydraulic lock 5. Being controlled by the port V1 pressure oil 1, the port V4 is communicated with the port V2. The returned oil reaches the port B1 of the three-position four-way electric control reversing valve 4 after passing through the ports V4 and V2 of the hydraulic lock; as the DN3 solenoid coil is powered, the port B1 is communicated with the port T1, and the returned oil flows back to the oil tank.

In the electric control system of the three-position four-way electric control reversing valve 4, the electric control components for stroke measurement are arranged on the leveling mechanism 9, and the measured distance is bigger than the preset standard distance in that case.

3. Contraction of the Piston Rod of the Cam Valve Controlling Hydraulic Cylinder:

The port P1 of the hydraulic pump 1 provides the pressure oil reaching the oil inlet P3 of the two-position three-way electric control reversing valve 3. DN1 of the two-position three-way electric control reversing valve 3 is powered, the pressure oil reaches the oil outlet P5 of the two-position three-way electric control reversing valve 3 from the port P3, and then the outlet P5 pressure oil directly reaches the oil inlet P7 of the three-position four-way cam valve 6, wherein the three-position four-way cam valve 6 is arranged on the leveling mechanism 9, the end of the valve element of the three-position four-way cam valve 6 is in contact with the ground; when the distance between the leveling mechanism 9 and the ground becomes smaller, the valve element moves upwards, the port P7 pressure oil reaches the oil outlet B2 of the three-position four-way cam valve 6, then the outlet B2 pressure oil reaches the port V6 of the hydraulic lock 7 and the pressure oil reaches the port V8 by the check valve in the hydraulic lock 7; finally the pressure oil (hydraulic oil) reaches the front oil port C2 of the hydraulic cylinder 8; the piston rod of the hydraulic cylinder contracts into the cylinder, and the hydraulic cylinder controls the leveling mechanism 9 to move upwards. The oil returns from the rear oil port C1 of the hydraulic cylinder 8 to the oil port V7 of the hydraulic lock 7; being controlled by the port V6 pressure oil, the port V7 is communicated with the port V5. The returned oil reaches the port A2 of the three-position four-way cam valve 6 through the ports V7 and V5 of the hydraulic lock 7; being controlled by the valve element position of the cam valve, the port A2 is communicated with T2, and the returned oil flows back to the oil tank.

4. Extension of the Piston Rod of the Cam Valve Controlling Hydraulic Cylinder:

The port P1 of the hydraulic pump 1 provides the pressure oil reaching the oil inlet P3 of the two-position three-way electric control reversing valve 3. DN1 of the two-position three-way electric control reversing valve 3 is powered, the pressure oil directly reaches the oil outlet P5 of the two-position three-way electric control reversing valve 3, and then the outlet P5 pressure oil directly reaches the oil inlet P7 of the three-position four-way cam valve 6, wherein the three-position four-way cam valve 6 is arranged on the leveling mechanism 9, the end of the valve element of the three-position four-way cam valve 6 is in contact with the ground; when the distance between the leveling mechanism 9 and the ground becomes bigger, the valve element is extruded by the spring of the cam valve to move downwards, the pressure oil in the port P7 of the three-position four-way cam valve 6 reaches the oil outlet A2 of the three-position four-way cam valve 6, then the outlet A2 pressure oil reaches the port V5 of the hydraulic lock 7 and reaches the port V7 by the check valve in the hydraulic lock 7; finally the pressure oil reaches the rear oil port C1 of the hydraulic cylinder 8; the piston rod of the hydraulic cylinder extends out of the cylinder, and the hydraulic cylinder 8 controls the leveling mechanism 9 to move upwards. The oil returns from the front oil port C2 of the hydraulic cylinder 8 to the oil port V8 of the hydraulic lock 7. Being controlled by the port V5 pressure oil, the port V8 is communicated with the port V6. The returned oil reaches the port B2 of the three-position four-way cam valve 6 through the ports V8 and V6 of the hydraulic lock 7; being controlled by the valve element position of the cam valve, the port A2 is communicated with the port T2, and the returned oil flows back to the oil tank.

We claim:

1. A hydraulic control system of a leveling hydraulic cylinder of a loading head, comprising a hydraulic pump, a two-position three-way electronic control reversing valve, a three-position four-way electronic control reversing valve, a three-position four-way cam valve and a hydraulic cylinder; wherein:

- an oil inlet of the two-position three-way electronic control reversing valve is connected with the hydraulic pump, one oil outlet of the two-position three-way electronic control reversing valve is connected with an oil outlet of the three-position four-way electronic control reversing valve, and the other oil outlet of the two-position three-way electronic control reversing valve is connected with an oil inlet of the three-position four-way cam valve;
- two oil outlets of the three-position four-way electronic control reversing valve are respectively connected to a front oil port and a rear oil port of the hydraulic cylinder after passing through a hydraulic lock;
- two oil outlets of the three-position four-way cam valve are also respectively connected to the front oil port and the rear oil port of the hydraulic cylinder by the hydraulic lock.

2. The hydraulic control system of the leveling oil hydraulic cylinder of the loading head of claim 1, wherein an overflow valve is arranged on an oil line between the hydraulic pump and the two-position three-way electric control reversing valve.

* * * * *